US010204460B2

(12) United States Patent
Hodges

(10) Patent No.: US 10,204,460 B2
(45) Date of Patent: Feb. 12, 2019

(54) SYSTEM FOR PERFORMING DRIVER AND VEHICLE ANALYSIS AND ALERTING

(71) Applicant: Verizon Patent and Licensing Inc., Basking Ridge, NJ (US)

(72) Inventor: Eric Todd Hodges, Dana Point, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 276 days.

(21) Appl. No.: 15/200,738

(22) Filed: Jul. 1, 2016

(65) Prior Publication Data

US 2017/0011562 A1 Jan. 12, 2017

Related U.S. Application Data

(60) Provisional application No. 62/191,066, filed on Jul. 10, 2015.

(51) Int. Cl.
| | |
|---|---|
| *G07C 5/00* | (2006.01) |
| *H04W 4/04* | (2009.01) |
| *H04L 12/26* | (2006.01) |
| *G08G 1/00* | (2006.01) |
| *G07C 5/08* | (2006.01) |
| *G09B 29/00* | (2006.01) |
| *B60W 40/10* | (2012.01) |
| *G06Q 50/30* | (2012.01) |
| *G08G 1/01* | (2006.01) |
| *G08G 1/09* | (2006.01) |

(Continued)

(52) U.S. Cl.
CPC ............. *G07C 5/008* (2013.01); *B60W 40/10* (2013.01); *G06Q 50/30* (2013.01); *G07C 5/006* (2013.01); *G07C 5/0808* (2013.01); *G07C 5/0816* (2013.01); *G08G 1/0112* (2013.01); *G08G 1/0129* (2013.01); *G08G 1/0141* (2013.01); *G08G 1/094* (2013.01); *G08G 1/0962* (2013.01); *G08G 1/096716* (2013.01); *G08G 1/096741* (2013.01); *G08G 1/096775* (2013.01); *G08G 1/205* (2013.01); *G08G 1/207* (2013.01); *G09B 7/02* (2013.01); *G09B 19/167* (2013.01); *G09B 29/007* (2013.01); *H04L 43/16* (2013.01); *H04W 4/046* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 7,433,889 B1 | 10/2008 | Barton | |
| 7,706,964 B2 | 4/2010 | Horvitz et al. | |

(Continued)

OTHER PUBLICATIONS

Astrata, Fleet Management Professionals, http://www.astrata.eu/, Astrata Europe B.V., 8 pages, accessed Oct. 21, 2015.

(Continued)

*Primary Examiner* — Kimberly S Berona
*Assistant Examiner* — Michael F Whalen

(57) ABSTRACT

Systems and methods are disclosed for collecting vehicle data from a vehicle engine computer of a vehicle and a plurality of sensors disposed about the vehicle and generating feedbacks for a driver of the vehicle using at least the vehicle data. One or more validation checks may be performed before the feedbacks are provided to the driver.

19 Claims, 3 Drawing Sheets

(51) Int. Cl.
G08G 1/0962 (2006.01)
G08G 1/0967 (2006.01)
G09B 7/02 (2006.01)
G09B 19/16 (2006.01)
H04W 84/04 (2009.01)

(56) References Cited

U.S. PATENT DOCUMENTS

| | | | |
|---|---|---|---|
| 8,040,256 B2 | 10/2011 | Rani et al. | |
| 8,428,307 B2 | 4/2013 | Bradai et al. | |
| 8,509,987 B2 | 8/2013 | Resner | |
| 8,510,200 B2* | 8/2013 | Pearlman | G09B 19/14 |
| | | | 705/36 R |
| 8,552,847 B1 | 10/2013 | Hill | |
| 8,630,768 B2 | 1/2014 | McClellan | |
| 9,081,650 B1* | 7/2015 | Brinkmann | G07C 5/008 |
| 9,104,535 B1* | 8/2015 | Brinkmann | B60W 40/09 |
| 9,129,460 B2 | 9/2015 | McClellan | |
| 9,135,759 B2 | 9/2015 | Baer et al. | |
| 9,676,392 B1* | 6/2017 | Brinkmann | B60W 40/09 |
| 2005/0273264 A1* | 12/2005 | Gern | B60W 40/08 |
| | | | 701/301 |
| 2010/0153005 A1 | 6/2010 | Cerecke et al. | |
| 2010/0188288 A1 | 7/2010 | Bahlmann et al. | |
| 2011/0320492 A1* | 12/2011 | Inghelbrecht | G06Q 40/08 |
| | | | 707/776 |
| 2012/0022904 A1 | 1/2012 | Mason et al. | |
| 2012/0123632 A1 | 5/2012 | Nejah | |
| 2012/0226390 A1 | 9/2012 | Adams et al. | |
| 2012/0307064 A1 | 12/2012 | Schenken | |
| 2013/0211660 A1 | 8/2013 | Mitchell | |
| 2013/0338914 A1* | 12/2013 | Weiss | G08G 1/09626 |
| | | | 701/465 |
| 2014/0195310 A1 | 7/2014 | McQuade | |
| 2015/0197247 A1 | 7/2015 | Ichinokawa | |
| 2016/0112216 A1 | 4/2016 | Sargent et al. | |
| 2016/0117928 A1 | 4/2016 | Hodges et al. | |
| 2017/0140652 A1* | 5/2017 | Hodges | G08G 1/20 |
| 2018/0062996 A1* | 3/2018 | Lei | H04L 45/745 |

OTHER PUBLICATIONS

Vehicle Telematics—Batrak, 6 pages, http://www.batrak.co.uk/vehicle, accessed Oct. 1, 2015.
The Impact of Measuring Driver and Vehicle Behavior, 7 pages, http://www.teletrac.com/teletrac/content/fleet-tools/whitepaper/10152014-impact-of-measuring-driver-vehicle-behavior.pdf, accessed Oct. 1, 2015.
Telematics & Compliance, Fleet Telematics, DOT Compliance Software, GPS Fleet Tracking, 3 pages, http://www.descartes.com/solutions/routing-mobile-telematics/telematics-compliance, accessed Oct. 1, 2015.
VeriLocation Vehicle Tracking, 8 pages, http://www.verilocation.com/vehicle-tracking/, accessed Oct. 1, 2015.
Geotab, OBD Aftermarket Devices, 3 pages, http://www.geotab.com/obd-aftermarket-devices/, accessed Oct. 1, 2015.
A remote attack on an aftermarket telematics service, Argus Cyber Security—Zubie Device, 5 pages, http://www.argus-sec.com/blog/remote-attack-aftermarket-telematics-service/, accessed Oct. 1, 2015.
Monitoring Driver Behavior Can Improve Safety, Reduce Costs-Article-TruckingInfo.com, 10 pages, http://www.truckinginfo.com/article/story/2011/11/rnonitoring-driver-behavior-can-improve-safety-reduce-costs.apx, dated Nov. 2011.
Garmin, Fleet-ready Navigators Partners, 2 pages, http://www8.garmin.com/solutions/mobile-resource-management/partners/, accessed Oct. 20, 2015.
Fleet Management—GPS Vehicle Tracking Geotab, A World Leading Fleet Tracking Device, 7 pages, http://www.geotab.com/, accessed Oct. 20, 2015.
Vehicle Tracking, Fleet & Asset Tracking, Driver Performance Management, Masternaut, 6 pages, http://www.masternaut.com/, accessed Oct. 20, 2015.
MiX Telematics, 6 pages, http://www.mixtelematics.com/, © 2014 Mix Telematics, accessed Oct. 20, 2015.
Navman Wireless, 2 pages, http://www.navmanwireless.com/, accessed Oct. 20, 2015.
Telogis, One Platform for Connected Intelligence, 6 pages, http://www.telogis.com/, accessed Nov. 23, 2015.
Teletrac, Trucking Software, 6 pages, http://www.teletrac.com/trucking-software, accessed Oct. 20, 2015.
TomTom Telematics, Fleet Management & Vehicle Tracking, 1 page, http://business.tomtom.com/en_gb/, accessed Oct. 20, 2015.
Transics—a WABCO Company, Wabco Debuts New Fleet Management Solution TX-Trailerguard at IAA Commercial Vehicles 2014, 7 pages, http://www.transics.com/wabco-debuts-new-fleet-management-solution-tx-trailguard-iaa-commercial-vehicles-2014-first-integrated-platform-launched-transics-acquisition/, dated Sep. 23, 2014.
Trimble, Transforming the Way the World Works, 1 page, http://www.trimble.com/, accessed Oct. 20, 2015.
Vehco corporate, Solutions for Drivers, 2 pages, http://www.vehcogroup.com/, accessed Oct. 20, 2015.
Inthinc Safety—Generic, Safety, The Proactive Approach to Vehicle and Driver Safety, 5 pages, http://www.inthinc.com/safety, accessed Oct. 8, 2015.
Clark, Drowsy Driver Alert System, Will your next car wake you up when you fall asleep at the wheel?, 2 pages, http://auto.howstuffworks.com/car-driving-safety/safety-regulator-devices/car-wake-you-up1.htm, accessed Oct. 14, 2015.
Telogis Unveils a suite of New Products designed to improve productivity, 3 pages, http://fleetowner.com/technology/telogis-unveils-suite-new-products-designed-improve-productivity, dated Jun. 5, 2013.
Telogis Puts Next-Generation Solutions in the Hands of the Mobile Worker, 5 pages, http://www.telogis.com/press-releases/next-generation-mobile-workers, dated May 22, 2013.

* cited by examiner

SYSTEM FOR PERFORMING DRIVER AND VEHICLE ANALYSIS AND ALERTING

RELATED APPLICATIONS

Any and all applications, if any, for which a foreign or domestic priority claim is identified in the Application Data Sheet of the present application are hereby incorporated by reference under 37 CFR 1.57.

BACKGROUND

A vehicle management system and in-vehicles devices can be used to assist in planning and servicing routes of a fleet of vehicles.

SUMMARY

In some embodiments, a system for processing fleet vehicle information and generating feedbacks for drivers of vehicles can include: a memory device configured to store a first feedback threshold, a location data quality threshold, a channel quality threshold, and an operation data quality threshold; and a processor comprising digital logic circuitry in communication with the memory device, the processor being configured to: receive, via a computer network, vehicle data indicative of operations of a plurality of vehicles in a vehicle fleet while the plurality of vehicles travels on a network of streets in a geographic region, the vehicle data being obtained from vehicle engine computers of the plurality of vehicles and wired or wireless sensors coupled to the plurality of vehicles, the vehicle data usable to determine a first operation value indicative of a condition of a first vehicle of the plurality of vehicles while the first vehicle travels on the network of streets, compare the first operation value to the first feedback threshold, in response to determining that the first operation value satisfies the first feedback threshold, perform a first validation check at least by: determining whether a location data quality of location data denoting a location of the first vehicle satisfies the location data quality threshold, determining whether a channel quality of a first communication channel through which the processor and the first vehicle communicate satisfies the channel quality threshold, and determining whether an operation value quality of the first operation value satisfies the operation data quality threshold, in response to determining that the first validation check is passed, generate a first feedback for a first driver of the first vehicle and transmit, via the first communication channel, the first feedback in real-time to a first device disposed in the first vehicle for presentation to the first driver while the first vehicle travels on the network of streets, and in response to determining that the first validation check is failed, not generate the first feedback or not transmit the first feedback to the first device, wherein the first validation check is failed at least when one or more of: the location data quality does not satisfy the location data quality threshold, the channel quality does not satisfy the channel quality threshold, and the operation value quality does not satisfy the operation data quality threshold.

The system of the preceding paragraph can include one or more of the following features: The vehicle data is usable to determine a second operation value indicative of a condition of a second vehicle of the plurality of vehicles while the second vehicle travels on the network of streets, and the processor is configured to: compare the second operation value to a second feedback threshold; in response to determining that the second operation value satisfies the second feedback threshold, perform a second validation check; in response to determining that the second validation check is passed, generate a second feedback for a second driver of the second vehicle and transmit, via a second communication channel, the second feedback in real-time to a second device disposed in the second vehicle for presentation to the second driver while the second vehicle travels on the network of streets; and in response to determining that the second validation check is failed, not generate the second feedback or not transmit the second feedback to the second device. The processor is configured to: perform the first validation check further at least by: determining whether a road condition of one or more roads of the network of streets on which the first vehicle is traveling satisfies a road condition threshold, and determining whether an atmospheric condition of an environment around the first vehicle satisfies an atmospheric condition threshold, wherein the first validation check is failed at least when one or more of: the road condition does not satisfy the road condition threshold and the atmospheric condition does not satisfy the atmospheric condition threshold. The vehicle data is usable to determine a second operation value indicative of a different condition of the first vehicle than the condition while the second vehicle travels on the network of streets, and the processor is configured to: compare the second operation value to a second feedback threshold; in response to determining that the second operation value satisfies the second feedback threshold, perform a second validation check; in response to determining that the second validation check is passed, generate a second feedback for the first driver and transmit, via the first communication channel, the second feedback in real-time to the second device for presentation to the first driver together with the first feedback. The first feedback provides information to the first driver that the first vehicle is experiencing a negative vehicle health condition, and the second feedback provides information to the first driver that the first vehicle is located within a restricted area. The processor is configured to: determine a confidence associated with the first feedback from a degree to which one or more of: the location data quality satisfies the location data quality threshold, the channel quality satisfies the channel quality threshold, and the operation value quality satisfies the operation data quality threshold; and transmit, via the first communication channel, the confidence in real-time to the first device for presentation to the first driver together with the first feedback. The location data comprises Global Positioning System (GPS) data, the first communication channel comprises a cellular communications network, and the operation value quality is indicative of a reliability of the first operation value or an accuracy of the first operation value. The first operation value comprises a speed of the first vehicle. The processor is configured to calculate the first operation value from at least a first value of the vehicle data and a second value of the vehicle data. The vehicle data comprises the first operation value. The first feedback comprises a coaching to improve a driving performance of the first driver. The first feedback provides information to the first driver regarding one or more of an acceleration of the first vehicle by the first driver, a braking of the first vehicle by the first driver, and a speeding of the first vehicle by the first driver. In response to receiving the first feedback, the first device is configured to provide to the first driver an audible alert responsive to the first feedback.

In some embodiments, a method for processing fleet vehicle information and generating feedbacks for drivers of vehicles can include: under controller of a processor comprising digital logic circuitry: receiving, via a computer network, vehicle data indicative of operations of a plurality of vehicles in a vehicle fleet while the plurality of vehicles travels on a network of streets in a geographic region, the vehicle data being obtained from vehicle engine computers of the plurality of vehicles and wired or wireless sensors coupled to the plurality of vehicles, the vehicle data usable to determine a first operation value indicative of a condition of a first vehicle of the plurality of vehicles while the first vehicle travels on the network of streets; comparing the first operation value to a first feedback threshold; in response to determining that the first operation value satisfies the first feedback threshold, performing a first validation check at least by: determining whether a location data quality of location data denoting a location of the first vehicle satisfies a location data quality threshold, determining whether a channel quality of a first communication channel through which the processor and the first vehicle communicate satisfies a channel quality threshold, and determining whether an operation value quality of the first operation value satisfies an operation data quality threshold; in response to determining that the first validation check is passed, generating a first feedback for a first driver of the first vehicle and transmitting, via the first communication channel, the first feedback in real-time to a first device disposed in the first vehicle for presentation to the first driver while the first vehicle travels on the network of streets, and in response to determining that the first validation check is failed, not generating the first feedback or not transmitting the first feedback to the first device, wherein the first validation check is failed at least when one or more of: the location data quality does not satisfy the location data quality threshold, the channel quality does not satisfy the channel quality threshold, and the operation value quality does not satisfy the operation data quality threshold.

The method of the preceding paragraph can include one or more of the following features: The vehicle data is usable to determine a second operation value indicative of a condition of a second vehicle of the plurality of vehicles while the second vehicle travels on the network of streets, and further comprising: comparing the second operation value to a second feedback threshold; in response to determining that the second operation value satisfies the second feedback threshold, performing a second validation check; in response to determining that the second validation check is passed, generating a second feedback for a second driver of the second vehicle and transmitting, via a second communication channel, the second feedback in real-time to a second device disposed in the second vehicle for presentation to the second driver while the second vehicle travels on the network of streets; and in response to determining that the second validation check is failed, not generating the second feedback or not transmitting the second feedback to the second device. The vehicle data is usable to determine a second operation value indicative of a different condition of the first vehicle than the condition while the second vehicle travels on the network of streets, and further comprising: comparing the second operation value to a second feedback threshold; in response to determining that the second operation value satisfies the second feedback threshold, performing a second validation check; in response to determining that the second validation check is passed, generating a second feedback for the first driver and transmitting, via the first communication channel, the second feedback in real-time to the second device for presentation to the first driver together with the first feedback. The first feedback provides information to the first driver that the first vehicle is expe-riencing a negative vehicle health condition, and the second feedback provides information to the first driver that the first vehicle is located within a restricted area. The method further comprising: determining a confidence associated with the first feedback from a degree to which one or more of: the location data quality satisfies the location data quality threshold, the channel quality satisfies the channel quality threshold, and the operation value quality satisfies the operation data quality threshold; and transmitting, via the first communication channel, the confidence in real-time to the first device for presentation to the first driver together with the first feedback. The location data comprises Global Positioning System (GPS) data, the first communication channel comprises a cellular communications network, and the operation value quality is indicative of a reliability of the first operation value or an accuracy of the first operation value. The first operation value comprises a speed of the first vehicle.

BRIEF DESCRIPTION OF THE DRAWINGS

The features of various embodiments are described with reference to the drawings. Throughout the drawings, reference numbers are re-used to indicate correspondence between referenced elements. The drawings are provided to illustrate embodiments described herein and not to limit the scope thereof.

DETAILED DESCRIPTION

A vehicle system is described herein that can perform a variety of features related to performing vehicle driver analysis and alerting. In certain embodiments, a vehicle management system and in-vehicle devices (see FIG. 1) can implement any combination of the features described herein.

Driving Behavior Feedback

Feedback about driving performance of a driver of a fleet vehicle can be provided to the driver to improve the driver's driving performance. For example, vehicle data can be transmitted in real-time from a vehicle or a gateway device, such as one of the in-vehicle devices 105A . . . 105N, associated with the vehicle to the vehicle management system 110. The vehicle management system 110 can process the vehicle data and evaluate the performance of the driver. Upon the conclusion of this processing, the vehicle management system 110 can transmit in real-time information about the performance of the driver to the vehicle or the gateway device associated with the vehicle for presentation to the driver.

Figure 1:
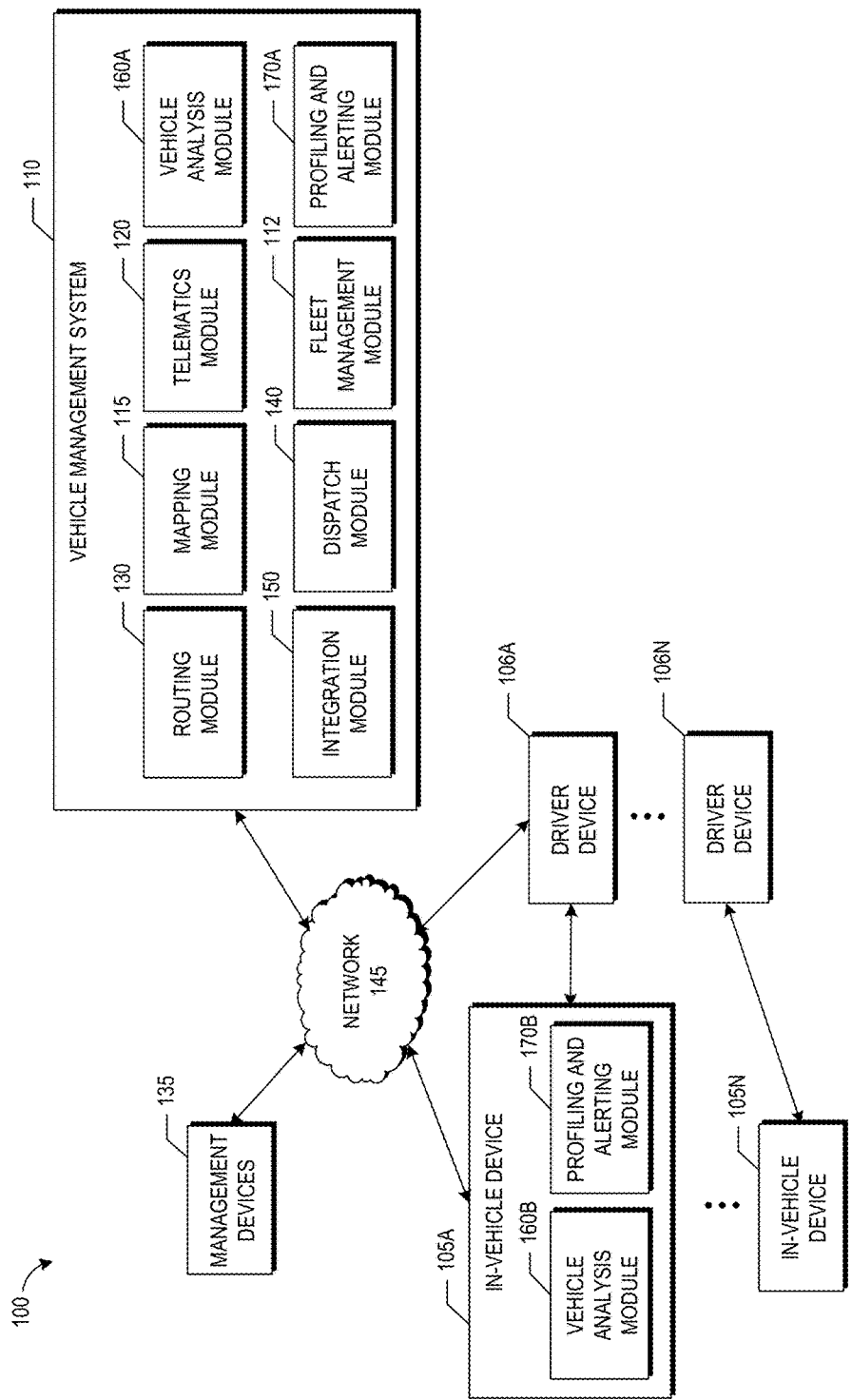
FIG. 1 illustrates an example computing environment including a vehicle management system and in-vehicle devices.

FIG. 1 illustrates a computing environment 100 for implementing an example of a vehicle management system 110, which is further described below. The example vehicle management system 110 shown includes a vehicle analysis module 160 that can perform analysis for vehicles and drivers of the vehicles. The vehicle analysis module 160 can be implemented by one or more physical computing devices. The vehicle analysis module 160 can be configured to perform onboard and/or offboard analysis and may be implemented in the system 110 (as offboard module 160A) and/or in the in-vehicle devices (as onboard module 160B). The onboard vehicle analysis module 160B optionally included in the vehicle can include one or more computers coupled to the vehicle computer. For example, in one embodiment, the onboard vehicle analysis module 160B is a computing device or gateway device coupled to the vehicle computer through the OBDII port or CAN bus. The computing device can also be in communication with a radio device that transmits data from the computing device to the vehicle management system 110 or to other devices.

The vehicle analysis module 160A or 160B can collect and gather data and information about the engine from the vehicle computer and/or data from other sensors in or on the vehicle. The onboard vehicle analysis module 160B can communicate the collected vehicle data and information to the vehicle management system 110.

The profiling and alerting module 170 can be used to output an alert, such as a notification or coaching, for presentation to the driver in an unobtrusive way. For instance, the profiling and alerting module 170 can (i) output the alert itself audibly or visually or (ii) transmit the alert to one of the driver devices 106 associated with the driver or an in-vehicle system, such as an in-vehicle display, speaker, seat-belt, or vehicle entertainment system associated with the vehicle that the driver is driving, to alert (for example, a vibration or change of item color) or coach (for example, verbal or written information) the driver in real-time about violations of laws or company rules while the driver is driving. The profiling and alerting module 170 can be implemented by one or more physical computing devices. The profiling and alerting module 170 can be configured to perform onboard and/or offboard analysis and may be implemented in the system 110 (as offboard module 170A) and/or in the in-vehicle devices (as onboard module 170B). In one embodiment, when a driver enters a vehicle, one of the driver devices 106 associated with the driver can tie or associate to the vehicle or the gateway module 205. For example, a vehicle identification number (VIN) can be tied or associated to a smart phone of the driver so that the vehicle data gathered by the gateway module 205 can further be associated with the driver of the vehicle. As a result, when the driver drives different vehicles, the vehicle data associated with driving each of the different vehicles can be compiled and associated with the same driver.

The profiling and alerting module 170 can alert based on one or more conditions. For example, the profiling and alerting module 170 can alert when a driver exceeds a certain acceleration or deceleration limit. As another example, the profiling and alerting module 170 can alert with an audible sound or series of beeps when a driver exceeds a certain acceleration or deceleration limit when a vehicle is traveling less than one threshold (for example, 20 miles per hour) or greater than another threshold (for example, 60 miles per hour). Moreover, the profiling and alerting module 170 can perform computations with the vehicle data parameters to come up with a score or to determine thresholds, such as the threshold used for alerting the driver.

The profiling and alerting module 170 can perform validation of data used for generating alerts to confirm that the alerts are accurate, timely, precise, useful, or sufficiently detailed before outputting the alerts or coaching for presentation to a driver of a vehicle. Advantageously, in certain embodiments, the offboard profiling and alerting module 170A may be better suited to perform this confirmation than the onboard profiling and alerting module 170B because the offboard profiling and alerting module 170A may have greater processing capabilities (for example, utilize faster processors or multiple processors configured in a way to increase processing speed) or better access to additional data usable to perform the confirmation (for example, data about road conditions, driver or profile history, weather, fleet performance, vehicle performance, multiple pieces of real-time data about the status of the vehicle, or the like). In one example, the offboard profiling and alerting module 170A can perform validation of data received from one of the in-vehicle devices 105A . . . 105N that indicates a driver of a vehicle associated with the in-vehicle device 105A . . . 105N may have exceeded a posted speed limit. Based on this validation, the offboard profiling and alerting module 170A can (i) determine whether or not to provide the alert or (ii) determine and provide a confidence (for example, a low confidence indication or a high confidence indication) associated with the alert for presentation to the driver.

Figure 3:
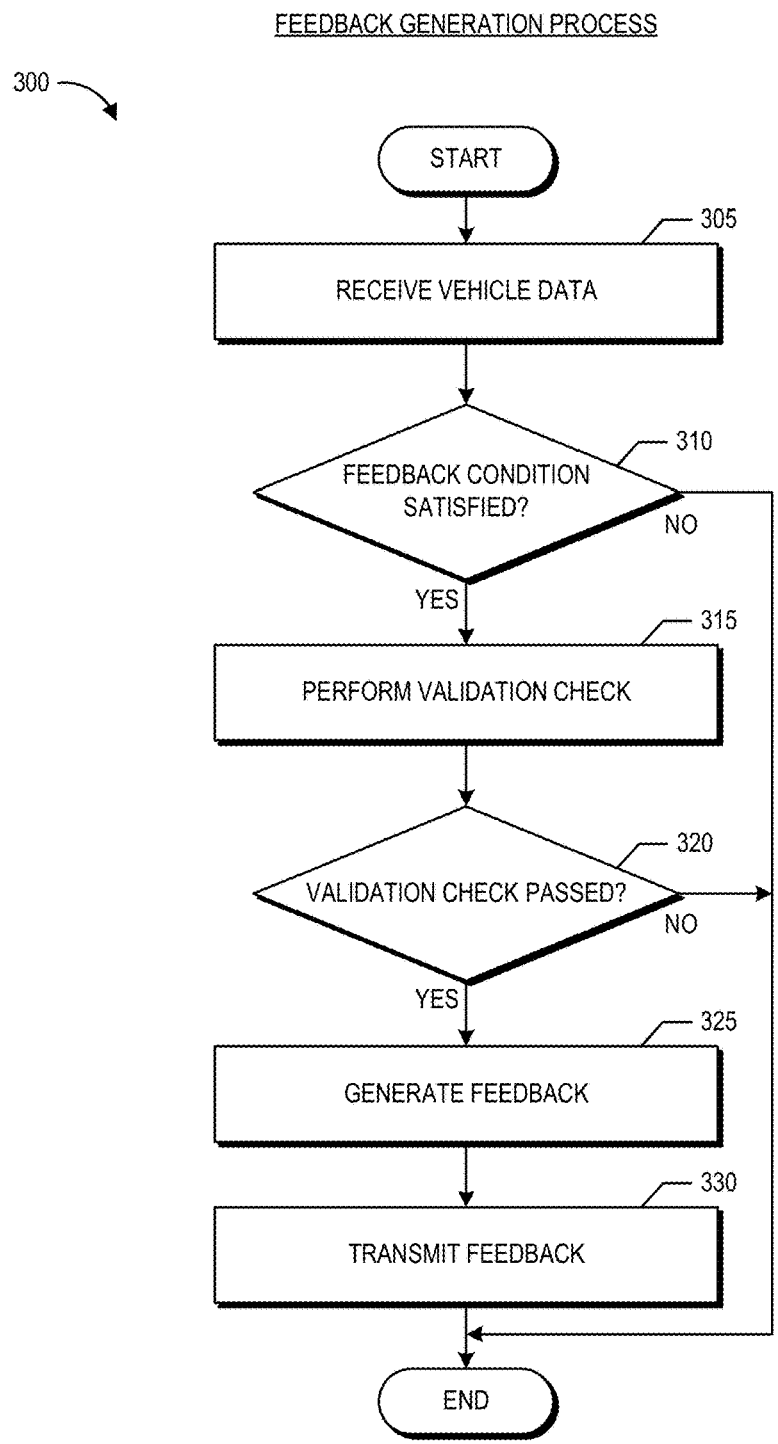
FIG. 3 illustrates an example feedback generation process.

FIG. 3 depicts a feedback generation process 300. The process 300 illustrates an example mode of operation of the computing environment 100 and may be implemented by the various components shown in the computing environment 100. For convenience, the process 300 is described in the context of the computing environment 100 but may instead be implemented by other systems described herein or other computing systems not shown. The process 300 provides one example approach by which the offboard profiling and alerting module 170A can validate, generate, and transmit a feedback to one of the in-vehicle devices 105A . . . 105N, such as the in-vehicle device 105A, for presentation to a driver of a vehicle of a vehicle fleet that contains the one of the in-vehicle devices 105A . . . 105N while the vehicle travels on a network of streets.

At block 305, the vehicle management system 110 can receive vehicle data. For instance, the vehicle data can be received by the offboard profiling and alerting module 170A from one or more of the in-vehicle devices 105A . . . 105N, vehicle engine computers, and sensors placed about the vehicles of the vehicle fleet. The vehicle data can be obtained from the vehicle engine computers or the sensors. The vehicle data can be usable to determine, such as by calculation or data extraction by the offboard profiling and alerting module 170A, operation values indicative of conditions of the vehicles of the fleet of vehicles while the fleet of vehicles travels on a network of streets in a geographic region. For example, the offboard profiling and alerting module 170A can receive or determine to one or more operation values usable to determine whether one or more of the following conditions are satisfied:

Negative vehicle health conditions (for example, Oil Levels, Fluid Temperatures, Battery Condition, Low Tire Pressure, Engine Light on, or other system warnings)

Vehicle location is within a restricted area (for example, hazardous area, outside company service territory, non-customer location, or no sparking because of nearby explosive material)

Vehicle weight greater than predefined threshold (for example, federal laws prevent class of vehicle from being overloaded with cargo).

Restricted vehicle use by road type (for example, commercial vehicle on restricted road)

Restricted vehicle use by load (for example, hazardous materials load on restricted road)

Restricted vehicle use by driver skillset (for example, driver has skillset to drive a category of vehicle)

Restricted vehicle use by time of day (for example, do not use vehicle after business hours)

Restricted vehicle use by day of week (for example, do not use vehicle on Saturday and Sunday)

Restricted vehicle use by holiday (for example, Christmas, Memorial Day, or Labor day)
In reverse (gear) for longer than predefined duration
Hard Brake event
Hard Acceleration event
Hard Cornering event
Speeding above predefined speed threshold
Speeding above predefined speed for greater than predefined duration
Speeding above posted speed limit
Speeding above defined threshold of posted speed limit
Speeding above predefined threshold of posted speed limit for greater than predefined duration
Vehicle swerving
Driver seatbelt fastened
Passenger seatbelt fastened
Vehicle following too close to another vehicle in front of vehicle
Changes in speed limit (for example, school zones when school is in session)
Driver deviated from location of predefined route
Driver deviated from predefined route time window
Driver has signed into vehicle
Driver has pre-inspected vehicle before route begun
Unauthorized fuel purchase made
Mile per gallon below predefined threshold for vehicles
Federal or state department of transportation limits on hours of service that about to be violated (for example, driving while on duty longer than predefined duration)
Dangerous intersection (for example, higher than average collision rates at particular intersections)
Dangerous sections of roads (for example, higher than average rollover event rates on sections of roads)
Biometric conditions of driver out of specification (for example, driver heart rate and time since rest outside of predefined limits)

At block 310, the vehicle management system 110 can determine whether a feedback condition (such as one of the conditions described in the preceding paragraph) is satisfied. For instance, the offboard profiling and alerting module 170A can compare one or more of the operation values described in the preceding paragraph to one or more thresholds to determine whether the feedback condition is satisfied. In some implementations, the one or more thresholds can be set or adjusted by user configuration, such as so that the one or more thresholds can be set at certain levels one day for the vehicle fleet and other levels another day for the vehicle fleet, thereby for instance enabling a sensitivity of the comparison to be controlled. When the feedback condition is not satisfied, the process 300 can end.

When the feedback condition is satisfied, at block 315, the vehicle management system 110 can perform a validation check. For instance, the offboard profiling and alerting module 170A can perform validation of data used for or associated with feedback, such as the one or more operation values or associated data, by checking (for example, against one or more thresholds) one or more of:
  GPS quality
  Cellular quality
  Accuracy or reliability of data being reported
  Average speed of other drivers on same road segment, potentially indicating whether a speed is excessive relative to one or more other drivers
  Road conditions (such as vehicle accidents or road construction)
  Atmospheric conditions
  Traffic conditions
  Posted speed limit of road
  Implied speed limit of road by road category In one example, the offboard profiling and alerting module 170A can determine that the GPS quality of data used to generate a feedback is low, so that there may be insufficient confidence in the accuracy or reliability to output the feedback for presentation to a driver. In another example, the offboard profiling and alerting module 170A can determine that the cellular quality associated with the data used to generate a feedback is low, so that the feedback generated based on the data may be untimely if provided to a driver in real-time.

At block 320, the vehicle management system 110 can determine whether the validation check at block 315 is passed or failed. For instance, in response to the offboard profiling and alerting module 170A determining that any of or a particular subset of the individual checks at block 315 do not satisfy one or more thresholds, the offboard profiling and alerting module 170A can determine that the validation check at block 315 is failed. On the other hand, the offboard profiling and alerting module 170A can determine that the validation check at block 315 is passed when all or a certain subset of the individual checks at block 315 satisfy the one or more thresholds. When the validation check is failed, the process 300 can end.

When the validation check is passed, at block 325, the vehicle management system 110 can generate feedback. The offboard profiling and alerting module 170A can, for example, generate a feedback for a driver of the vehicle fleet. The one or more feedbacks can be responsive to the feedback condition that was satisfied at block 310 and may provide, for instance, coaching to improve driving performance of the driver with respect to the feedback condition, as well as possibly provide feedback for one or more other conditions.

At block 330, the vehicle management system 110 can transmit the feedback. For instance, the offboard profiling and alerting module 170A can output the feedback via a communication channel to an in-vehicle device, such as in-vehicle device 105A, associated with the driver for presentation to the driver while the driver drives, such as on a display or as an audible alert to the driver (for example, as three consecutive beeps). In some implementations, the feedback can be provided to the driver in ways, for example, described in U.S. Patent Application Publication No. 2016/0117928, filed Oct. 23, 2015, and entitled "SYSTEMS AND METHODS FOR PERFORMING DRIVER AND VEHICLE ANALYSIS AND ALERTING"; the entire disclosure of which is incorporated by reference herein.

In some implementations, the driver can provide a user input, such as to the in-vehicle device or as described in U.S. Patent Application Publication No. 2016/0117928 like with respect to FIG. 3, that responds to the feedback. The user input or data reflective of the user input can, in turn, be transmitted to the vehicle management system 110. Subsequently, the offboard profiling and alerting module 170A can use the user input or data reflective of the user input to adjust or process differently feedbacks or rules associated with feedbacks, such as described in U.S. Patent Application Publication No. 2016/0117928 like with respect to FIG. 4. The adjustments or different processing can advantageously, in certain embodiments, enable the offboard profiling and alerting module 170A to more accurately, appropriately, meaningfully, or valuably process or provide feedbacks in the future.

In one example, the in-vehicle device 105A can be positioned in a vehicle and transmit a current speed of the vehicle to the vehicle management system 110 while a driver drives the vehicle. The offboard profiling and alerting module 170A can perform the process 300 with the current speed to confirm whether the vehicle is speeding and also perform a validation check. If the vehicle is determined to be speeding and the validation check is passed, the offboard profiling and alerting module 170A can generate and transmit a feedback to the in-vehicle device 105A for presentation to the driver. In turn, the driver may respond to the feedback with a user input that indicates a speed limit used by the offboard profiling and alerting module 170A to generate the alert is inaccurate (for example, does not reflect the posted speed limit) and, in some instances, may additionally input an accurate speed limit. The in-vehicle device 105A can transmit the user input or data reflective of the user input to the vehicle management system 110 to enable the offboard profiling and alerting module 170A to adjust or process differently feedbacks or rules associated with feedbacks for future speed alerting.

Figure 2:
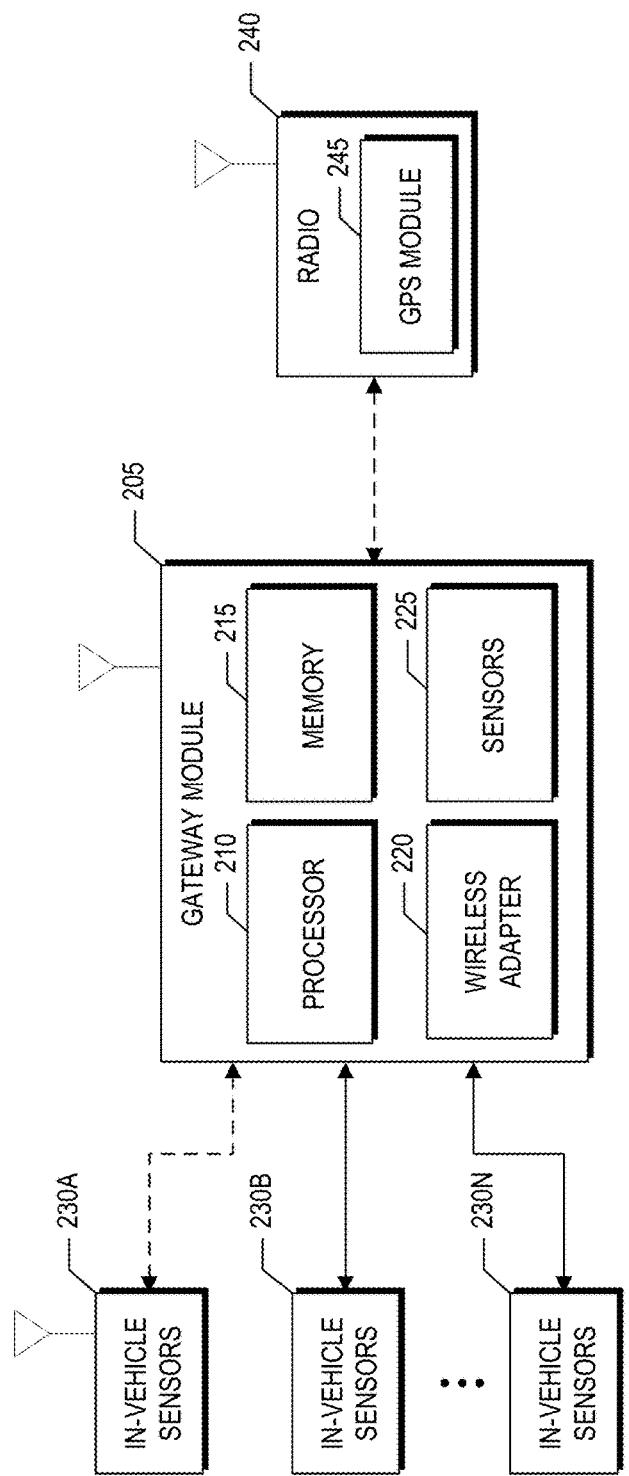
FIG. 2 illustrates an example in-vehicle device.

FIG. 2 illustrates an embodiment of a gateway module 205. The gateway module 205 is a more detailed embodiment of one of the in-vehicle devices 105A . . . 105N described herein and includes some or all the features thereof. The gateway module 205 can be a vehicle based data acquisition and transmission sub-system. In the depicted embodiment, the gateway module 205 has a processor 210, memory 215, a wireless adapter 220, and one or more sensors 225. In some embodiments, the sensors 225 are omitted. The sensors 225 can be configured to measure vehicle data, such as vehicle position, temperature, time, acceleration, audio, and direction.

A radio 240 communicates with the gateway module 205, either wirelessly or through a wired connection (for example, with a serial cable or the like). The radio 240 includes a GPS module 245 that detects vehicle position. The radio 240 can transmit data received from the gateway module 205 to the vehicle management system 110. The radio 240 can also communicate vehicle positioning data received from the GPS module 245 to the vehicle management system 110. In one embodiment, the radio 240 communicates with the vehicle management system by placing a cell phone call to a server of the vehicle management system 110. The radio 240 can also communicate with the server at the vehicle management system 110 using TCP/IP protocols. By sending data frequently or periodically, the radio 240 can keep the connection to the server open, which can guarantee or help to guarantee data reliability.

Any number of in-vehicle sensors 230 located within the vehicle can communicate with the gateway module 205. The in-vehicle sensors 230 can be located throughout the vehicle, including, for example, the engine, tires, vehicle body, trailer, cargo areas, and other locations on and within the vehicle. Some examples of vehicle sensors include engine oil sensors, fuel level sensors, light sensors, door sensors, ignition sensors, temperature sensors (including in cab and in trailer), and tire pressure sensors. At least some of the in-vehicle sensors 230 can communicate with the engine computer or other engine hardware configured to receive and process the data. The in-vehicle sensors can also be located remotely and can transmit the data wirelessly to the engine computer or other data processing hardware. For example, a tire pressure sensor could wirelessly transmit tire pressure data to the engine computer for processing.

Likewise, the gateway module 205 can also include sensors. One example of a sensor 225 that may be included in the gateway is an accelerometer. An accelerometer can detect hard braking, cornering, and acceleration. The accelerometer can therefore allow position coordinates to be updated without resort to GPS or triangulation technology. For example, the accelerometer can provide for short-term position reporting that operates without resorting to GPS signals. The gateway module 205 can offer a low cost longitude, latitude capability and combined hard braking sensor for vehicle history applications, such as the vehicle history systems and methods described in U.S. application Ser. No. 13/251,129, titled "History Timeline Display for Vehicle Fleet Management," filed Sep. 30, 2011, the disclosure of which is hereby incorporated by reference in its entirety. As a device, in certain embodiments, the gateway module 205 can enable data from multiple sensors to be acquired without adding wires or optical connections to the vehicle for those sensors.

The gateway module 205 can be in communication with some or all of the in-vehicle sensors 230. For example, the gateway module 205 can be coupled to an OBDII or CAN bus in the vehicle to thereby receive in-vehicle sensor information from the engine computer. In some embodiments, one or more in-vehicle sensors can be directly coupled to the gateway module 205, or the gateway module 205 can be configured to communicate wirelessly with the in-vehicle sensors. For example, the gateway module could receive cargo bay temperature data from a temperature sensor wirelessly transmitting the data. The wireless sensors can use point-to-point transmission using wireless transmission standards such as Bluetooth or Zigbee.

The processor 210 and memory 215 of the gateway module 205 can implement various features. Among others, the processor 210 of the gateway module 205 can perform the operations associated with the onboard vehicle analysis module 160 and the profiling and alerting module 170 described herein. The gateway module 205 can act as an intermediary processing platform for the vehicle management system 110. The gateway module 205 can process the data received from the in-vehicle sensors 230 and send a subset of the total data collected to the vehicle management system 110. The gateway module 205 can collect hundreds or thousands or more data points from sensors 225, in-vehicle sensors 230, and the engine computer. The gateway module 205 can, among other things, analyze, categorize, compress, or otherwise process the data before transmitting it to the vehicle management system 110. By preprocessing the data prior to sending the information to the vehicle management system 110, the gateway module 205 can determine what data to send to the vehicle management system 110, which can reduce redundant processing and bandwidth used to continually transmit vehicle data.

The gateway module 205 can monitor several vehicle characteristics. The sensors 225, 230 can provide information to the gateway module 205 at a specific frequency for each vehicle characteristic; however, the sensors 225, 230 may generally be recording data at a faster rate than the monitored vehicle characteristic is changing. As such, sending all of the data to the vehicle management system 110 every time a sensor provides data can waste bandwidth and provide redundant data points for the vehicle management system 110 to process. Advantageously, in certain embodiments, instead of sending all of this data to the vehicle management system 110, the gateway module 205 processes the data and selectively updates the vehicle management system 110. The gateway module 205 can also compress the data that is received. The gateway module 205 can selectively compress portions of data using compression techniques, including any lossy or lossless compression techniques. For example, the data relating to vehicle characteristics that are slowly changing can be compressed.

The gateway module 205 can process vehicle characteristics according to the rate at which the characteristics change. For example, engine characteristics can range from relatively slower changing characteristics, such as tire pressure or average fuel consumption, to relatively faster changing characteristics, such as engine RPM and speed. The gateway module 205 can provide updates to the vehicle management system 110 using different update approaches for each vehicle characteristic, including periodic updates, threshold-based updates, event-based updates, user-specified updates, and/or a combination of methods.

Periodic updates can provide updates to the vehicle management system 110 at a specified frequency. For example, the gateway module 205 may update the remaining vehicle fuel data every 5 minutes. Threshold based updates can provide updates when the value of the vehicle characteristic meets or exceeds a specified threshold. The thresholds can be static, determined dynamically by the system, user specified, or determined using any other method. The thresholds can be absolute, such as a specific value, or relative, such as a percentage based change a specific number of units. For example, tire pressure data could be updated when the tire pressure changes by 10%, or when it changes by 2 psi, or if pressure drops below 35 psi. Event-based updates can prompt updates after a specific event occurs. For example, an update of all the vehicle characteristics may be provided when the engine starts or when an engine error is detected.

The gateway module 205 can use a combination of methods or algorithms to determine the frequency of the updates to the vehicle management system 110. For example, the tire pressure data could have a periodic update and a threshold based update. The tire pressure data could be updated every 30 minutes. However if there was a blowout, it can be beneficial to have a more rapid or immediate update to the tire pressure. As such, the gateway module 205 could evaluate the tire pressure against a threshold that updates tire pressure when a change is detected. The gateway module 205 can provide update routines that are dependent on the operational phase of the vehicle, such as warm-up operation versus normal operation. As engine conditions stabilize after warm-up the gateway module 205 can increase the intervals at which updates are provided to the vehicle management system 110. In some embodiments the gateway module 205 can send the updated data to the vehicle management system 205 and the raw data. The raw vehicle data can include some or all of the data that the gateway module 205 receives from the sensors and vehicle computer. The raw data can be transmitted with or without the preprocessed updated vehicle data.

More generally, in certain embodiments, the gateway module 205 can be a system that performs wired and/or wireless data acquisition within a vehicle. The gateway module 205 can pool data from various sensors, apply time stamps to the data, reformat the data, compress the data, encode the data, and/or encrypt the data. Software running on the gateway module 205 can manage data acquisition and data formatting. The gateway module 205 can therefore acquire diagnostic bus and motor vehicle status data and forward the data, alerts, or coaching directly to the vehicle management system or another device, such as one of the driver devices 106 via Bluetooth™, WiFi™, Ethernet, RS232/422, USB or other suitable wired or wireless physical interfaces.

Example Vehicle Management System

As described above, FIG. 1 illustrates an embodiment of a computing environment 100 for implementing a vehicle management system 110 that can implement any of the features described herein, including the enclosed Appendices.

In the computing environment 100, one or more in-vehicle devices 105A . . . 105N and management devices 135 communicate with the vehicle management system 110 over a network 145. The in-vehicle devices 105A . . . 105N can include computing devices installed in fleet vehicles. These devices 105A . . . 105N can include navigation functionality, routing functionality, and the like. The in-vehicle devices 105A . . . 105N can receive route information and other information from the vehicle management system 110. In addition, the in-vehicle devices 105A . . . 105N can report information to the vehicle management system 110, such as driver location, vehicle sensor data, vehicle status (for example, maintenance, tire pressure, or the like), and so forth.

The management devices 135 can be computing devices used by dispatchers, fleet managers, administrators, or other users to manage different aspects of the vehicle management system 110. For example, a user of one of the management devices 135 can access the vehicle management system 110 to generate routes, dispatch vehicles and drivers, and perform other individual vehicle or fleet management functions. With the management devices 135, users can access and monitor vehicle information obtained from one or more of the in-vehicle devices 105A . . . 105N by the vehicle management system 110. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like.

The vehicle management system 110 can be implemented by one or more physical computing devices, such as servers. These servers can be physically co-located or can be geographically separate, for example, in different data centers. In one embodiment, the vehicle management system 110 is implemented as a cloud computing application. For instance, the vehicle management system 110 can be a cloud-implemented platform hosted in one or more virtual servers and/or physical servers accessible to users over the Internet or other network. In the depicted embodiment, the vehicle management system 110 includes a fleet management module 112, a mapping module 115, a telematics module 120, a routing module 130, a dispatch module 140, and an integration module 150. These components can, but need not, be integrated together on a common software or hardware platform.

The fleet management module 112 can include functionality for generating, rendering, or otherwise displaying a vehicle management user interface. The vehicle management user interface can include a map or list of vehicles that depicts symbols or other data representative of vehicles. As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 112 can communicate with the mapping module 115 to obtain mapping data, which the fleet management module 112 can include in the vehicle management user interface. The mapping data can be compressed, transmitted, re-rendered, and displayed on the management user interface. Other data can also be overlaid to enhance the map and management layout. The mapping module 115 can be a geographic information system (GIS) in one embodiment. The fleet management module 112 can also access the telematics module 120 to obtain vehicle status data for inclusion in-vehicle history timelines. The telematics module 120 can provide this vehicle status data based on telematics data obtained from the in-vehicle devices 105A . . . 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 130 can implement any of the routing features described above. In addition, the routing module 130 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. In addition, the routing module 130 can automatically select routes that take into account factors that affect energy usage using the techniques described in U.S. application Ser. No. 12/954,547, filed Nov. 24, 2010, and entitled "Vehicle Route Selection Based on Energy Usage," the disclosure of which is hereby incorporated by reference in its entirety.

The integration module 130 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 130.

Furthermore, although not shown, the vehicle management system 110 may include functionality for disabling an engine remotely to recover a stolen vehicle (as permitted in Europe and some other areas).

The network 145 may be a LAN, a WAN, the Internet, combinations of the same, or the like. For ease of illustration, the vehicle management system 110 has been depicted as a centralized system. However, in other implementations, at least some of the functionality of the vehicle management system 110 is implemented in other devices. Other possible implementations of the vehicle management system 110 can include many more or fewer components than those shown in FIG. 1.

Terminology

Any of the systems and processes described herein can be performed in real time or near real-time. As used herein, the term "real-time" and the like, in addition to having its ordinary meaning, can mean rapidly or within a certain expected or predefined time interval, and not necessarily immediately. For instance, real-time may be within a few seconds, few minutes, or 5 minutes, or 10 minutes, or some other short period of time after a triggering event.

Many other variations than those described herein will be apparent from this disclosure. For example, depending on the embodiment, certain acts, events, or functions of any of the algorithms described herein can be performed in a different sequence, can be added, merged, or left out all together (for example, not all described acts or events are necessary for the practice of the algorithm). Moreover, in certain embodiments, acts or events can be performed concurrently, for example, through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed:

1. A system for processing fleet vehicle information and generating feedbacks for drivers of vehicles using at least the fleet vehicle information, the system comprising:
   a first vehicle of a plurality of vehicles in a vehicle fleet, each vehicle of the plurality of vehicles comprising an in-vehicle device, a vehicle engine computer, and an in-vehicle accelerometer, wherein the in-vehicle devices are capable to communicate with respective vehicle engine computers of the plurality of vehicles in the vehicle fleet to access in-vehicle engine data and the in-vehicle device capable to communicate directly with a respective in-vehicle accelerometer; and
   a vehicle management system comprising:
      a memory device configured to store a first feedback threshold, a location data quality threshold, a channel quality threshold, and an operation data quality threshold; and
      a processor comprising digital logic circuitry in communication with the memory device, the processor being configured to:
         receive, via a computer network, vehicle data indicative of operations of the plurality of vehicles in the vehicle fleet from the in-vehicle devices while the plurality of vehicles travels on a network of streets in a geographic region, the vehicle data being obtained from the vehicle engine computers of the plurality of vehicles and the in-vehicle accelerometer, which are wired or wireless sensors coupled to a respective vehicle of the plurality of vehicles, the vehicle data usable to determine a first operation value indicative of a condition and a driver behavior of the first vehicle of the plurality of vehicles while the first vehicle travels on the network of streets;
         compare the first operation value to the first feedback threshold;
         in response to determining that the first operation value satisfies the first feedback threshold, perform a first validation check at least by:
            determining whether a location data quality of location data denoting a location of the first vehicle satisfies the location data quality threshold;
            determining whether a channel quality of a first communication channel through which the processor and the first vehicle communicate satisfies the channel quality threshold; and
            determining whether an operation value quality of the first operation value satisfies the operation data quality threshold,
         in response to determining that the first validation check is passed, generate a first feedback comprising a coaching for a first driver of the first vehicle to improve a driving performance and transmit, via the first communication channel, the first feedback in real-time to a first device disposed in the first vehicle for presentation to the first driver while the first vehicle travels on the network of streets; and
         in response to determining that the first validation check is failed, not generate the first feedback or not transmit the first feedback to the first device, wherein the first validation check is failed at least when one or more of: the location data quality does not satisfy the location data quality threshold, the channel quality does not satisfy the channel quality threshold, and the operation value quality does not satisfy the operation data quality threshold.

2. The system of claim 1, wherein the vehicle data is usable to determine a second operation value indicative of a condition of a second vehicle of the plurality of vehicles while the second vehicle travels on the network of streets, and the processor is configured to:
   compare the second operation value to a second feedback threshold;
   in response to determining that the second operation value satisfies the second feedback threshold, perform a second validation check;
   in response to determining that the second validation check is passed, generate a second feedback for a second driver of the second vehicle and transmit, via a second communication channel, the second feedback in real-time to a second device disposed in the second vehicle for presentation to the second driver while the second vehicle travels on the network of streets; and
   in response to determining that the second validation check is failed, not generate the second feedback or not transmit the second feedback to the second device.

3. The system of claim 1, wherein the processor is configured to:
   perform the first validation check further at least by:
      determining whether a road condition of one or more roads of the network of streets on which the first vehicle is traveling satisfies a road condition threshold, and
      determining whether an atmospheric condition of an environment around the first vehicle satisfies an atmospheric condition threshold,
   wherein the first validation check is failed at least when one or more of: the road condition does not satisfy the road condition threshold and the atmospheric condition does not satisfy the atmospheric condition threshold.

4. The system of claim 1, wherein the vehicle data is usable to determine a second operation value indicative of a different condition of the first vehicle than the condition while the second vehicle travels on the network of streets, and the processor is configured to:
 compare the second operation value to a second feedback threshold;
 in response to determining that the second operation value satisfies the second feedback threshold, perform a second validation check;
 in response to determining that the second validation check is passed, generate a second feedback for the first driver and transmit, via the first communication channel, the second feedback in real-time to the second device for presentation to the first driver together with the first feedback.

5. The system of claim 4, wherein the first feedback provides information to the first driver that the first vehicle is experiencing a negative vehicle health condition, and the second feedback provides information to the first driver that the first vehicle is located within a restricted area.

6. The system of claim 1, wherein the processor is configured to:
 determine a confidence associated with the first feedback from a degree to which one or more of: the location data quality satisfies the location data quality threshold, the channel quality satisfies the channel quality threshold, and the operation value quality satisfies the operation data quality threshold; and
 transmit, via the first communication channel, the confidence in real-time to the first device for presentation to the first driver together with the first feedback.

7. The system of claim 1, wherein the location data comprises Global Positioning System (GPS) data, the first communication channel comprises a cellular communications network, and the operation value quality is indicative of a reliability of the first operation value or an accuracy of the first operation value.

8. The system of claim 1, wherein the first operation value comprises a speed of the first vehicle.

9. The system of claim 1, wherein the processor is configured to calculate the first operation value from at least a first value of the vehicle data and a second value of the vehicle data.

10. The system of claim 1, wherein the vehicle data comprises the first operation value.

11. The system of claim 1, wherein the first feedback provides information to the first driver regarding one or more of an acceleration of the first vehicle by the first driver, a braking of the first vehicle by the first driver, and a speeding of the first vehicle by the first driver.

12. The system of claim 1, wherein in response to receiving the first feedback, the first device is configured to provide to the first driver an audible alert responsive to the first feedback.

13. A method for processing fleet vehicle information and generating feedbacks for drivers of vehicles using a system comprising a first vehicle of a plurality of vehicles in a vehicle fleet, each vehicle of the plurality of vehicles comprising an in-vehicle device, a vehicle engine computer, and an in-vehicle accelerometer, wherein the in-vehicle devices are capable to communicate with respective vehicle engine computers of the plurality of vehicles in the vehicle fleet to access in-vehicle engine data and the in-vehicle device capable to communicate directly with a respective in-vehicle accelerometer; and a vehicle management system, the method comprising:
 under controller of a processor comprising digital logic circuitry:
  accessing vehicle data by an in-vehicle device through vehicle engine computers and in-vehicle accelerometer;
  receiving, via a computer network, the vehicle data indicative of operations of a plurality of vehicles in a vehicle fleet while the plurality of vehicles travels on a network of streets in a geographic region, the vehicle data being obtained from the vehicle engine computers of the plurality of vehicles and the in-vehicle accelerometer, which are wired or wireless sensors coupled to the plurality of vehicles, the vehicle data usable to determine a first operation value indicative of a condition and driver behavior of a first vehicle of the plurality of vehicles while the first vehicle travels on the network of streets;
  comparing the first operation value to a first feedback threshold;
  in response to determining that the first operation value satisfies the first feedback threshold, performing a first validation check at least by:
   determining whether a location data quality of location data denoting a location of the first vehicle satisfies a location data quality threshold;
   determining whether a channel quality of a first communication channel through which the processor and the first vehicle communicate satisfies a channel quality threshold; and
   determining whether an operation value quality of the first operation value satisfies an operation data quality threshold;
  in response to determining that the first validation check is passed, generating a first feedback comprising coaching for a first driver of the first vehicle to improve a driving performance and transmitting, via the first communication channel, the first feedback in real-time to a first device disposed in the first vehicle for presentation to the first driver while the first vehicle travels on the network of streets; and
  in response to determining that the first validation check is failed, not generating the first feedback or not transmitting the first feedback to the first device,
  wherein the first validation check is failed at least when one or more of: the location data quality does not satisfy the location data quality threshold, the channel quality does not satisfy the channel quality threshold, and the operation value quality does not satisfy the operation data quality threshold.

14. The method of claim 13, wherein the vehicle data is usable to determine a second operation value indicative of a condition of a second vehicle of the plurality of vehicles while the second vehicle travels on the network of streets, and further comprising:
 comparing the second operation value to a second feedback threshold;
 in response to determining that the second operation value satisfies the second feedback threshold, performing a second validation check;
 in response to determining that the second validation check is passed, generating a second feedback for a second driver of the second vehicle and transmitting, via a second communication channel, the second feedback in real-time to a second device disposed in the second vehicle for presentation to the second driver while the second vehicle travels on the network of streets; and in response to determining that the second validation check is failed, not generating the second feedback or not transmitting the second feedback to the second device.

15. The method of claim 13, wherein the vehicle data is usable to determine a second operation value indicative of a different condition of the first vehicle than the condition while the second vehicle travels on the network of streets, and further comprising:
   comparing the second operation value to a second feedback threshold;
   in response to determining that the second operation value satisfies the second feedback threshold, performing a second validation check;
   in response to determining that the second validation check is passed, generating a second feedback for the first driver and transmitting, via the first communication channel, the second feedback in real-time to the second device for presentation to the first driver together with the first feedback.

16. The method of claim 15, wherein the first feedback provides information to the first driver that the first vehicle is experiencing a negative vehicle health condition, and the second feedback provides information to the first driver that the first vehicle is located within a restricted area.

17. The method of claim 13, further comprising:
   determining a confidence associated with the first feedback from a degree to which one or more of: the location data quality satisfies the location data quality threshold, the channel quality satisfies the channel quality threshold, and the operation value quality satisfies the operation data quality threshold; and
   transmitting, via the first communication channel, the confidence in real-time to the first device for presentation to the first driver together with the first feedback.

18. The method of claim 13, wherein the location data comprises Global Positioning System (GPS) data, the first communication channel comprises a cellular communications network, and the operation value quality is indicative of a reliability of the first operation value or an accuracy of the first operation value.

19. The method of claim 13, wherein the first operation value comprises a speed of the first vehicle.

* * * * *